United States Patent Office 3,508,964
Patented Apr. 28, 1970

3,508,964
STARCH OF GOOD WATER RETENTION
Philip Roemer, Bradley, and Russell Downhour, Jr., Kankakee, Ill., assignors to General Foods Corporation, White Plains, N.Y., a corporation of Delaware
No Drawing. Filed July 27, 1966, Ser. No. 568,103
Int. Cl. C08b 25/02; C10m 7/26; C13l 1/08
U.S. Cl. 127—33                                             6 Claims

ABSTRACT OF THE DISCLOSURE

A starch product having good water retention is prepared by wetting amylaceous material in the presence of a base, elevating the temperature of the wetted material and then extruding the material to produce an expanded product which is then dried and ground.

---

This invention relates to drilling mud additives of use in the rotary method of boring oil and gas wells.

In our co-pending U.S. patent application Ser. No. 525,320 filed Feb. 7, 1966, now Patent No. 3,318,865, for drilling mud additives is described a process for the extrusion gelatinization of starch containing materials at reduced water levels to achieve a desired level of water soluble solids. The process of said application has enjoyed significant commercial acceptance.

An improved process has now been found whereby the low water loss characteristic of the gelatinized starch of our co-pending application in drilling muds can be improved, thereby permitting a highly beneficial water binding colloid of use in salt and fresh water drilling muds. The product of the present invention exhibits eminent improvements in the ability to provide reduced water loss in drilling muds over a range of mud temperatures and concentrations and permits rapid dispersion of the additive and rapid reduction of water loss from the mud whereby less additive is required to bring the water loss to a given point and hold it at that point. These drilling additive benefits are enjoyed over a wide range of mud types and retain these superior properties for prolonged periods.

The process of the present invention involves wetting ground amylaceous material in the presence of a base or base forming water soluble alkaline earth material to a moisture content of 18%–32% and elevating the temperature of the thus wetted material to at least 140° F. The thus heated and wetted material is transferred to a confined zone of high pressure wherein the material is heated to an elevated gelatinizing temperature and compressed under shearing stresses to cause the starch granules of the material to undergo a substantially complete loss of birefringence and partial degradation to yield water soluble solids; conveniently, the thus treated material is caused to issue through an extrusion orifice to an unconfined zone of lower pressure and thus cause 10%–50% of the water in the mass being extruded to evaporate as steam rapidly and cause the mass to expand. As a consequence of such temperature treatment and compression as well as the ensuing extrusion the material is degraded to the extent that at least 25% and commonly 35%–45% of its dry solids are water soluble at room temperature. The thus extruded product may be eventually dried and ground for convenience of packaging, storage and shipment to the drilling site.

The preferred water soluble alkaline earth compound of use in the present invention is calcium hydroxide, although other calcium compounds such as calcium oxide can be used to like advantage, generally in a range of 0.25 to 1.5%, preferably about 0.75% by weight of the unprocessed starch-containing material.

The process of the present invention preferably involves finely dividing the starch-containing material, e.g., corn endosperm, to the extent that at least 80% will pass a USS No. 70 screen or finer and uniformly prewetting and steaming such finely divided material to a moisture content ranging between 18%–24% (wet basis), preferably 20%. During this wetting and steaming, the finely divided farinaceous material of the stated moisture content is subjected to heat just sufficient to elevate the material to a preferred temperature of 140°–210° F. at the point of introduction to a high temperature, high pressure, high shear continuous extrusion zone, the mixture being heterogenous just prior to such introduction. Treatment with heat and moisture in the presence of the aforesaid water soluble alkaline earth material, typically the calcium hydroxide, will be employed at a level just sufficient to induce a limited amount of starch dextrinization, the treated starch-containing material possessing no permanent shape retaining plastic characteristics of any significance at this point in the process; the thus treated material can be gripped manually and will not permanently retain the shape of hand pressure applied thereto; on the other hand the material still displays a granular pourable characteristic. The mixture has a pH of about 10.0 and may range anywhere from 9.5 upward depending upon the concentration of base.

While the invention is not to be restricted to this preferred condition of the heated and wetted calcium-treated starch material preparatory to extrusion gelatinization, it is believed that this condition is preferred since it achieves the uniform distribution and intimate chemical as well as physical combination required to generate the desired starch conversion that ensues upon the transfer of the material to the zone of high pressure and high temperature to be thereafter described.

Upon introduction to said high pressure and high temperature zone the mixture is then further heated, compressed and subjected to high shear forces and thereby converted to a coherent plastic mass due to development of frictional forces between the farinaceous particles and mechanical rotatory elements of the extrusion cooker, which cooker is preferably of the type described in U.S. Patent No. 3,117,006, issued Jan. 7, 1964 to Joseph Wenger, entitled "Method of Increasing Palatability and Digestibility of a Cereal Product." By such operation, the temperature of the mass is elevated to a point whereat the extrudate undergoes a moisture content reduction incident to extrusion of at least 10% and not more than 50% due to flash vaporization as the material is caused to issue from the extruder; the extrudate is in a form which initially expands upon emergence from the confined area of high pressure within the extrusion zone and then collapses to a cross-sectional area which is still in excess of extrusion orifice cross-sectional area. By this extrusion operation and the mechanical working incident thereto, gelatinization and rupture of the starch granules proceeds to the extent that a controlled amount of soluble starch degradation products are produced, generally, 25%–50% room temperature water soluble solids on a dry solids basis. Usually the level of water soluble solids thus produced will be higher as the moisture content of the wetted material is lower within the aforestated range, it being preferred to maximize the water soluble solids to a level of say 35%–45%, which level is achieved through the practice of moisture in the range 18%–24% in the wetted material charged to the extrusion cooker.

The particle size distribution of the farinaceous material as it is fed to the extrusion cooker is not critical although a fine granulation is preferred since it is desired that a controlled amount of frictional heat be generated by the working surfaces of the extrusion cooker operating at a comparatively reduced moisture level to achieve a maximal amount of starch degradation and consequent increase in the level of soluble solids. The heat treatment which the mass undergoes during extrusion cooking is a function both of the exothermic heat generated incident to wetting the base or base-forming alkaline earth material and of the frictional heat existing between kneading mechanical elements of the extrusion cooker or of such heat in combination with external heat applied to the kneaded mass as it is treated. The mass issuing from the die opening at the terminal portion of the extrusion chamber will be such that the starch content thereof when viewed microscopically will have lost substantially all birefringence and the starch cells will have been substantially ruptured, that is, at least 90%; indeed, the preferred optimal conditions of the present invention result in a product wherein only a number of starch cells too infrequent to count and statistically measure exhibit birefringence, so that for all practical purposes all the starch granules will have undergone a complete loss of birefringence and a large number thereof will have been ruptured.

EXAMPLE I

Ground brewer's corn grits having a particle size whereat 90% passes a USS No. 70 screen was fed together with 0.77% calcium hydroxide to a conditioning vessel in the apparatus shown and described in U.S. Patent No. 3,117,006 and wherein the ground corn flour was transmitted from hopper 10 to tube 14 in chamber 12 thereof, and wherein the flour was wetted and steamed to a moisture content of 20% through rotation of the screw flights within the cylindrical chamber defined by tube 14 in said patent. This apparatus promotes uniform mixing of the farinaceous material, calcium hydroxide, steam and water introduced thereto. The corn flour was elevated in approximately five seconds to a temperature of 180° F. as measured by direct reading thermometer inserted into the throat of the discharge from the treating chamber. During this step of the process the corn flour was soft due to the uptake of moisture added in the form of steam and water; in this condition the wetted corn flour will mold to the hand when it is subjected to normal hand pressure and will retain this shape but will break apart readily when subjected to a deformation force attempting to break up the shaped piece. At this point the starch component of the corn flour is not gelatinized materially.

The wetted corn mixture was then fed into the second tube of the extrusion cooking apparatus set forth in the cited Wenger patent and processed under conditions whereby the free space between the surface of the auger flights and the inner surface of the cooking chamber was substantially occupied by the material being advanced therein against the back pressure of the material passing through the extruding head so that the corn mixture in the cooking chamber was subjected to a combination of frictional heat and mechanical treatment by the work applied thereto as well as the heat of the steam fed to the jacket for the cooking chamber. The mass was then delivered to the outer chamber of the cooker where it was subjected to a high pressure and temperature build-up due to the narrowing of the free space between the tapering conical surface of the jacket and the complementary flights rotating therewithin as well as the restriction existing in the die plate through which the mass was extruded in the form of "ropes." Dwell time in the extrusion cooker was approximately 23 seconds.

By reason of the pressure and temperature build-up as the wetted calcium hydroxide-treated corn mixture passed through the extrusion cooker, part of the moisture of the extrudate was caused to flash off as steam as extrudate issued through the die plate, thereby causing the extrudate to expand to three to four times the volume of the die openings, whereafter the extrudate collapsed in a period of one to two seconds to a volume of one and a half to two times the volume of the die opening. The extrudate was thermoplastic, had a temperature of about 200° F. and if allowed to stand at room temperature rapidly cooled in about 2 to 3 minutes to a tough, horny, glassy form. The cooled extrudate appeared to have tiny openings at its surface, although at certain points along its length it had blisters or cavities. The interior of the cooled extrudate also had the same porous structure. The moisture content of the extrudate issuing from the chamber was between 15 and 17% moisture.

The hot plastic extrudate was then fed into a corn chopper wherein it was cut into lengths and deposited in a dryer having air circulating at a temperature of 300° F. to bring these lengths down to a moisture content of less than 8%. The dry product recovered was fed to a second chopper adapted to produce material which passed a screen having 1/4" openings therein and was then ground and hammer milled to usual flour fineness.

The final product has a density of approximately 600 grams per dry quart. This same product when ground to varying degrees of granulation below the aforesaid particle size still exhibits a product density in a range of 550 to 650 grams per dry quart. When the floury product was blended with an excess of water at room temperature, a portion thereof dissolved and was filtered off. The filtrate contained soluble solids at a level equivalent to 40% of the total weight of product admixed with the water. This farinaceous material has performance characteristics which compare most favorably with generally accepted standards of good water loss preventatives as measured by A.P.I. procedures for testing drilling fluids and particularly the filtration tests thereof.

The drilling mud additive to the present invention is useful in a variety of drilling conditions and displays similar water loss characteristics in salt, gypsum and fresh water muds.

The following test mud tabulated hereafter were prepared and the performance thereof tested.

TABLE I.—EXPANDER RUNS USING CALCIUM COMPOUNDS

[Water Loss (7.5 minutes filtration using procedure set forth below]

| Product | Fresh Water | Salt water |
| --- | --- | --- |
| (1) Control (without added calcium compound) | 3.7 | 3.2 |
| (2) 1.3% Ca(OH)₂ added | 2.7 | 2.2 |
| (3) 1.3% Ca(OH)₂ added | 2.5 | 2.2 |

The procedure for determining water loss was to mix the gelatinize starch product and clay slurry in a blender at low speed for 20 minutes, using a slurry of 6 gms. of starch and 20 gms. of clay per 350 mls. of water, this being equivalent to 6 lbs. of starch and 20 lbs. of clay per barrel of water (42 gal.). The filtration procedure used to determine water loss was the standard procedure for determining the filtration rate as described in "Recommended Uractice Standard Field Procedure for Testing Drilling Muds," API Code No. 29, fourth edition, published May 1957, beginning on page 8. This test briefly comprises measuring the total volume of filtrate water obtained during a given time interval of pressure filtration. The API procedure is to measure the filtrate over a 30 minute period at 100 p.s.i.

The concentrations of starch and clay solids in determining water loss (Table II) show that the reduction in water loss obtained with such calcium treated products was effective at varying clay and starch concentrations.

TABLE II.—WATER LOSS RESULTS VARYING STARCH AND CLAY RATIOS [1]

| Test Procedure (30 minutes filtration) | Untreated control extrusion glatinized starch | | Calcium hydroxide-treated 0.77% Ca(OH)$_2$ added extrusion gelatinized product of Example I | |
|---|---|---|---|---|
| | Salt | Fresh | Salt | Fresh |
| 6 lbs. starch 20 lbs. clay/bbl | 8.0 | 5.3 | 5.7 | 5.5 |
| 3 lbs. starch 20 lbs. clay/bbl | 25.2 | 9.4 | 14.9 | 8.3 |
| 3 lbs. starch 12 lbs. clay/bbl | 13.0 | 10.5 | 9.3 | 9.0 |

[1] Water loss expressed as mls. water passing filter from 350 mls. test mud and converted to a barrel basis.

Table III presents data regarding the effect of filtration temperatures. This data indicates that the calcium hydroxide-treated material is better for controlling water loss, not only at room temperature but at least up to 180° F. The improvement with the product of Example I is predominant in salt water systems which are the most important systems for starch muds.

TABLE III.—EFFECT OF TEST TEMPERATURE, WATER LOSS IN MLS. AS EXPRESSED IN TABLE II

| | Untreated control extrusion gelatinized starch | | Calcium hydroxide-treated extrusion gelatinized product of Example I | |
|---|---|---|---|---|
| | Salt | Fresh | Salt | Fresh |
| Room temperature | 8.0 | 5.3 | 5.7 | 5.5 |
| Muds heated to 120° F | 9.9 | 8.2 | 7.2 | 6.9 |
| Muds heated to 150° F | 11.3 | 6.9 | 9.0 | 6.5 |
| Muds heated to 180° F | 13.8 | 7.6 | 10.7 | 7.2 |

In Table IV is varied the shearing action in preparation of the mud, comparing the water loss results obtained from the procedure in Example I and the water loss obtained from muds prepared by much more severe mixing. This severe mixing created enough friction to heat the mud to 150° F. Again the water loss in salt water mud is much improved when Calcium-hydroxide treated extrusion gelatinized starch of Example I is used. The water loss determinations were made primarily in salt and fresh water muds which are the important muds from a starch usage standpoint.

TABLE IV.—EFFECT OF SHEAR

| | Untreated control extrusion gelatinized starch | | Calcium hydroxide-treated extrusion gelatinized product of Example I | |
|---|---|---|---|---|
| | Salt | Fresh | Salt | Fresh |
| Regular mix (85° F.) | 8.0 | 5.3 | 5.7 | 5.5 |
| Severe mixing to heat mud to 150° F | 13.5 | 5.3 | 9.5 | 6.4 |
| Mud cooled to 85° F | 12.8 | 5.6 | 9.3 | 5.2 |

While the invention has been described by reference to specific examples, it is understood that the tenets thereof can be applied to a variety of starch-containing materials, including cereal and tuber-derived flours such as sorghum and tapioca.

What is claimed is:

1. Process for producing a starch product comprising wetting ground amylaceous material in the presence of a base or base forming water soluble alkaline earth metal compound to a moisture content of 18%–32% and elevating the temperature of said wetted material to 140°–210° F.; transferring said heated and wetted material to a confined zone of high pressure wherein said material is heated to an elevated gelatinizing temperature and compressed under shearing stresses to cause the starch granules of said material to undergo a substantially complete loss of birefringence and be degraded to water soluble solids; issuing said gelatinized material through an extrusion orifice to an unconfined zone of lower pressure to cause 10 to 50% of the moisture content in the mass to flash off a steam rapidly and cause the mass to expand, the amylaceous content of said material being thereby degraded to the extent of producing a material containing at least 25% room temperature water soluble solids on a dry solids basis; and drying and grinding said material.

2. Process according to claim 1 wherein said amylaceous material is corn.

3. Product of the process of claim 1.

4. Process according to claim 1 wherein the alkaline earth metal is calcium.

5. Process of claim 4 wherein the compound is calcium hydroxide.

6. Product of the process of claim 4.

References Cited

UNITED STATES PATENTS

| 2,900,335 | 8/1959 | Bravos | 127—38 X |
| 3,078,187 | 2/1963 | Bravos | 127—71 X |
| 3,137,592 | 6/1964 | Protzman | 127—32 |
| 3,294,681 | 12/1966 | Stearns | 127—32 X |

MORRIS O. WOLK, Primary Examiner

S. MARANTZ, Assistant Examiner

U.S. Cl. X.R.

127—71; 252—8.5

UNITED STATES PATENT OFFICE
CERTIFICATE OF CORRECTION

Patent No. 3,508,964      Dated April 28, 1970

Inventor(s) Philip Roemer and Russell Downhour, Jr.

It is certified that error appears in the above-identified patent and that said Letters Patent are hereby corrected as shown below:

On column 1, line 22 "now Patent No. 3,318,865" should read --now Patent No. 3,518,185--.
On column 2,
    line 35 "thereafter" should be --hereafter--.
On column 4, line 37 "mud" should be --muds--; line 49 "1.3% Ca(OH)$_2$" should read --1% CaO--; line 57 "gelatinize" should be --gelatinized--; line 64 "Uractice" should be changed to --Practice--.
On column 5, line 11 "9.3" should read --9.2--; line 22 "WATER LOSS IN MLS. AS EXPRESSED IN TABLE II" should be --$^1$WATER LOSS IN MLS. AS EXPRESSED IN TABLE II-- and appear as a footnote.

SIGNED AND SEALED
DEC 8 1970

(SEAL)
Attest:

Edward M. Fletcher, Jr.
Attesting Officer

WILLIAM E. SCHUYLER, JR.
Commissioner of Patents